May 5, 1964  R. A. MUNSE  3,131,742
SEALING AND LOCKING WASHER FOR SHEET METAL NUT
Filed Jan. 6, 1961

INVENTOR.
ROBERT A. MUNSE
BY
Malcolm W. Fraser
ATTORNEY

United States Patent Office 3,131,742
Patented May 5, 1964

3,131,742
SEALING AND LOCKING WASHER FOR
SHEET METAL NUT
Robert A. Munse, Perrysburg, Ohio, assignor to The Bishop and Babcock Corporation, Cleveland, Ohio, a corporation of Ohio
Filed Jan. 6, 1961, Ser. No. 81,133
1 Claim. (Cl. 151—7)

This invention relates to new and useful improvements in fastening devices and has particular relation to a skirted fastener and deformable washer assembly for effecting a seal with the panel to which it is applied as well as to achieve a seal with the stud or similar member connected to the fastener.

Other objects and advantages of the invention will hereinafter appear and for purposes of illustration, but not of limitation, an embodiment of the invention is shown on the accompanying drawings in which—

Figure 1:
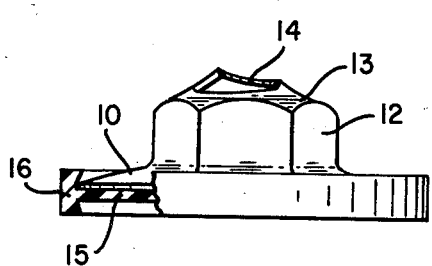
FIGURE 1 is a side elevation of the skirted nut and washer assembly, a part being broken away for purposes of clarity.
Figure 2:
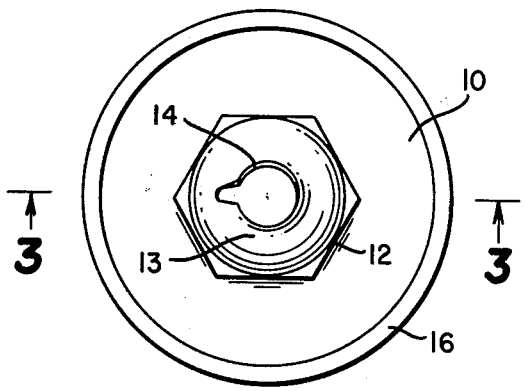
FIGURE 2 is a top plan view of the skirted nut and washer assembly.

The illustrated embodiment of the invention comprises a skirted nut which has a dished or concavo-convex round skirt or washer 10 with which is integral an upstanding tubular side wall 11 provided with a series of wrench-receiving flats 12. Integral with the upper end of the side wall 11 is a top wall 13 in which is formed a stamped nut 14 in the form of a hole bordered by a partial helix to engage the threads of a screw or the like. Instead of a nut, the helical edge portion may constitute a thread-forming element for cutting threads into the plain shank of a stud as will be readily understood.

Attached to the outer edge portion of the skirt 10 is a washer which may be of plastic material, such as polyethylene or similar material which is deformable under pressure. The plastic washer is formed with a flat relatively thin disc-like body which is circular and is formed at its periphery with a rim 16 which projects at substantially right angles above and below the body to an equal extent. On the inside of the rim 16, both above and below the body, is an inwardly extending annular lip 17. Thus the edge of the skirt or washer 10 of the fastener engages the rim below the lip 17 which retains the parts in assembled relation. The construction is such that it may be reversible which is such as to enable assembly from either side and thus expedite the assembly operation. The body 15 is provided with a central hole 18 which is axially aligned with the hole in the stamp nut 14 and is of slightly less diameter than that of the screw which it is intended to receive.

Figure 3:
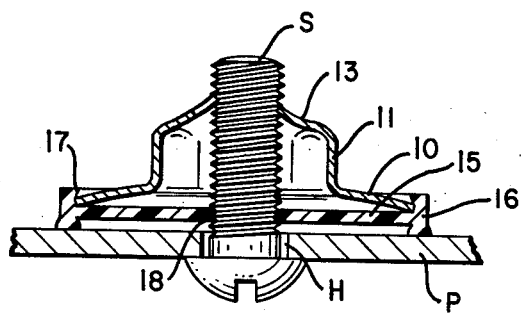
FIGURE 3 is a vertical sectional view of the skirted nut and washer assembly showing the same applied to a panel with a screw in engagement therewith.

As shown in FIGURE 3, the skirted nut and washer assembly is applied to one side of a panel P and the screw threaded stud S is inserted through a hole H in the panel and is forced rotatively through the smaller opening 18 so that it cuts its own thread therein and then engages the stamped nut 14. By tightening the screw, it will be manifest that the under portion of the rim which engages the panel is drawn tightly thereagainst and may be deformed to effect a liquid-tight seal. Inasmuch as the screw S cuts its own thread through the plastic washer, a liquid-tight seal is thus effected between the screw and the washer.

From the above it will be apparent that the skirted nut and washer are retained in assembled relation due to the structural features above described. The washer effects a seal with the panel to which it is applied and also effects a seal with the nut inasmuch as the nut intimately cuts its own thread into the washer. Another advantage of the structure is that the plastic washer centers the screw in the bottom of the nut to restrict cocking or canting of the screw relative to the nut which would otherwise interfere with the convenient application of the parts, particularly where they are disposed in a blind location.

Numerous changes in details of construction, arrangement and choice of materials may be effected without departing from the spirit of the invention, especially as defined in the appended claim.

What I claim is:

A fastener device comprising a nut body having a centrally disposed threaded member receiving aperture; an annular generally inverted dish-shaped skirt extending outwardly and downwardly from said nut body; a substantially planar disc-shaped washer member of substantially the same diameter as the diameter of said skirt and having a centrally disposed threaded member receiving hole of less diameter than the threaded member the nut is intended to receive in axial alignment with the aperture in said nut body, said washer member being formed of a deformable sealing material; and an integral annular continuous rim provided on the peripheral edge portion of said disc-shaped washer member and projecting at substantially right angles thereto, said rim extending a substantially equal distance beyond the opposite surfaces of said washer member, each outer end of said rim having an inwardly extending lip, each of said lips adapted to retain the marginal edge of said skirt to thereby connect said washer member to said nut body, and each outer end of said rim being adapted for sealing engagement with a supporting panel.

References Cited in the file of this patent
UNITED STATES PATENTS
2,761,349    Heller _____ Sept. 4, 1956
FOREIGN PATENTS
1,240,405    France _____ July 25, 1960